(12) United States Patent
Reddy et al.

(10) Patent No.: US 6,839,711 B1
(45) Date of Patent: Jan. 4, 2005

(54) CONFIGURABLE SPACE-TIME PERFORMANCE TRADE-OFF IN MULTIDIMENSIONAL DATA BASE SYSTEMS

(75) Inventors: Venugopal P. Reddy, Madison, NJ (US); Harmindar S. Matharu, Randolph, NJ (US)

(73) Assignee: i2 Technologies US, Inc., Dallas, TX (US)

( * ) Notice: Subject to any disclaimer, the term of this patent is extended or adjusted under 35 U.S.C. 154(b) by 729 days.

(21) Appl. No.: 09/652,520

(22) Filed: Aug. 31, 2000

Related U.S. Application Data

(60) Provisional application No. 60/151,964, filed on Sep. 1, 1999.

(51) Int. Cl.$^7$ .............................................. G06F 17/00
(52) U.S. Cl. ....................................... 707/101; 707/102
(58) Field of Search ............................... 707/102, 101, 707/103, 104, 10, 2

(56) References Cited

U.S. PATENT DOCUMENTS

| | | | |
|---|---|---|---|
| 5,835,905 A | * 11/1998 | Pirolli et al. .................... | 707/3 |
| 5,918,232 A | 6/1999 | Pousehine et al. .......... | 707/103 |
| 6,173,310 B1 | * 1/2001 | Yost et al. .................. | 709/201 |

OTHER PUBLICATIONS

Goil et al "High performance data miining using data cubes on parallel computers", IEEE 1998, pp. 548–555.*
Ezeife "A uniform approach for selecting views and indexes in a data warehouse", IEEE 1998, pp. 151–160.*
Data Warehousing Tool's Architecture: From Multidimensional Analysis to Data Mining, Remi Lehn, Viviane Lambert, Marie–Pierre Nachouki.
Building a Real Data Warehouse for Market Research, Jens Albrecht, Wolfgang Lehner, Michael Tesche, and Thomas Kirsche.
International Search Report for PCT Application No. PCT/US00/24045 dated Dec. 20, 2000.

\* cited by examiner

*Primary Examiner*—Uyen Le
(74) *Attorney, Agent, or Firm*—Baker Botts L.L.P.

(57) ABSTRACT

A multi-dimensional database includes data organized into hierarchical levels. For each level within a dimension, predefined thresholds are set to determine which intersections are precomputed and which are not. The general result is to precompute intersections which take relatively longer to compute at run time, and to not precompute intersections which can be calculated relatively quickly at run time. When multiple dimensions of data are provided, a step-by-step process uses the level threshold for each dimension to determine whether data is to be prestored at an intersection. An odd-even calculation insures that computations performed at run time are relatively efficient. The technique results in good run time response, while not requiring maximum storage or recalculation time for data updates. By adjusting the thresholds at the individual dimension level, response of the multi-dimensional database can be changed as desired.

18 Claims, 3 Drawing Sheets

```
For every level in every dimension
    If the level does not have any child levels
        For all members
            mark the flag stored
        endfor
    otherwise
        for every member
            for every child level (to take care of multiple hierarchies)
                reset member's count to zero
                for every member in the child level
                    if the child's flag is stored
                        add 1 to current member's count
                    otherwise
                        add the child's count to the current member's count
                    endif
                endfor
            endfor
            store the minimum of all counts computed in count
            if count is greater than threshold
                mark the flag stored
            otherwise
                mark the flag not-stored
                store the level yielding the minimum in child
            endif
        endfor
    endif
endfor
```

FIG. 4

GEOGRAPHY DIMENSION

| | NATIONAL | REGION | DISTRICT | TERRITORY |
|---|---|---|---|---|
| | (1) | (1) | (1–10) | (8/DISTRICT) |
| | | (2) | (1–20) | (10/DISTRICT) |
| | | (3) | (1) | (8) |
| | | | (2) | (2) |
| | | | (3) | (6) |
| | | | (4) | (4) |
| | | | (5) | (1) |
| | | (4) | (1–15) | (8/DISTRICT) |
| TOTAL No. | 1 | 4 | 40 | 421 |

PRODUCT DIMENSION

| | ALL PRODUCTS | CATEGORY | BRAND | SKU |
|---|---|---|---|---|
| | (1) | (1) | (1) | (10) |
| | | | (2) | (20) |
| | | | (3) | (100) |
| | | | (4) | (200) |
| | | | (5) | (35) |
| | | (2) | (1) | (10) |
| | | | (2) | (50) |
| | | | (3) | (80) |
| | | | (4) | (200) |
| | | (3) | (1) | (5) |
| | | | (2) | (10) |
| | | | (3) | (25) |
| TOTAL No. | 1 | 3 | 12 | 745 |

| GEOGRAPHY DIMENSION | | PRODUCT DIMENSION | |
|---|---|---|---|
| NATIONAL | 3 | ALL PRODUCTS | 4 |
| REGION | 10 | CATEGORY | 4 |
| DISTRICT | 4 | BRAND | 50 |
| TERRITORY | N/A | SKU | N/A |

FIG. 5

```
For every level in every dimension
    If the level does not have any child levels
        For all members
            mark the flag stored
        endfor
    otherwise
        for every member
            for every child level (to take care of multiple hierarchies)
                reset member's count to zero
                for every member in the child level
                    if the child's flag is stored
                        add 1 to current member's count
                    otherwise
                        add the child's count to the current member's count
                    endif
                endfor
            endfor
            store the minimum of all counts computed in count
            if count is greater than threshold
                mark the flag stored
            otherwise
                mark the flag not-stored
                store the level yielding the minimum in child
            endif
        endfor
    endif
endfor
```

*FIG. 6*

CONFIGURABLE SPACE-TIME PERFORMANCE TRADE-OFF IN MULTIDIMENSIONAL DATA BASE SYSTEMS

CROSS-REFERENCE TO RELATED APPLICATIONS

This Application claims the benefit of U.S. Provisional Application No. 60/151,964 filed Sep. 1, 1999. In addition, it contains subject matter in common with U.S. patent application Ser. No. 09/653,107, filed on even date herewith, titled MULTIDIMENSIONAL DATA BASE SYSTEM WITH INTERMEDIATE LOCKABLE INTERSECTIONS, which is assigned to the assignee hereof and incorporated by reference hereinto.

BACKGROUND OF THE INVENTION

1. Field of the Invention

The present invention relates generally to data storage in computer systems, and more specifically to a method for optimizing data storage and retrieval in database systems.

2. Description of the Prior Art

With the continued increase in computer system processing power and data storage capabilities, increasingly large databases are being made widely available. Simple database designs which work for small databases are generally unsuitable for very large databases, because access times tend to increase geometrically with the size of the database. Even with greatly enhanced processing power, times to access very large databases can become unmanageably long unless care is taken in design of the database.

In many large database systems, it is common to perform many more read accesses of the database than updates. For example, corporate current and historical sales information may be widely available within the company, with constant read access to the database provided. However, updating the data stored within the database can occur relatively less frequency. In systems having this type of access pattern, it is important to minimize the read access time in order to enhance overall system performance.

One database design in common use at the present time is OLAP. This database design technique can be run on several different types of underlying database engines, such as those commercially available from Hyperion, Oracle, and i2 Technologies. In addition to 1-dimenstional OLAP database structures, of particular interest to the present invention are MOLAP (Multidimensional OLAP) systems.

In such systems, some types of data, often referred to as aggregated data, can be pre-computed in order to improve read access times. Data that is suitable to be aggregated is that wherein, in a multidimensional database, data for a higher level may be generated using the data for lower level members within the structure. For example, unit sales of a product can be aggregated in a database which defines multiple sales territories within a sales region; the aggregate unit sales for the region is the sum of the sales for the individual territories.

In order to improve read access times, such aggregatable data can be precomputed, and stored in various locations within the database. In the above example, the region sales data for a product can be stored within the region entry, so that it can be directly accessed at run time by reading each of the sales territory numbers once, and storing the sum in the corresponding region entry. It is not necessary to access each of the sales territories when total sales for the region is desired.

MOLAP engines traditionally precompute all such aggregatable data. This leads to fast read access, but requires a relatively large amount of storage space. In general, the number of storage locations needed is equal to the number of elements in the cross-product of all of the members for each dimension. For example, if a two-dimensional database has 1,000 members in a region dimension, and 1,000 members in a products dimension, $1,000 \times 1,000 = 10^6$ intersections that must be precomputed. Storage of aggregateable data into every one of these intersections is expensive in terms of space.

In addition, whenever updates are performed to the database, precomputing all intersections affected by the update is relatively expensive in terms of processing time. Although the principal goal of the design is to minimize read access, doing so at the expense of extremely long write access times for updates lowers overall system performance.

Performing run time calculations minimizes the time required to update the database, but can be very slow at read time because of the large number of read accesses which are needed to calculate the number.

In order to optimize system operation, a number of techniques have been implemented in MOLAP systems which provide that only selected intersections are precomputed, while others are computed at run time. One approach is to store only a single data value if a parent and child intersection, or node, have a one-to-one relationship. Another approach is to have a user define, in advance, which nodes should be precomputed, and which should be computed on the fly at run time. This second approach provides the possibility of optimizing a database based upon the particulars of an application, but requires a certain amount of knowledge by an administrative user. It also becomes very difficult or impossible to implement when multiple dimensions, each having a large number of members, are incorporated in the database. In addition, when changes are made to the database, a user is required to again make a series of optimizing determinations.

It would be desirable to provide a multi-dimensional database system which had the capability to provide a reasonable optimization of a space-time trade off for a multi-dimensional database. It would be further desirable for such system and method to be relatively easy to define on the part of a user, and to adapt automatically to changes made to the database.

SUMMARY OF THE INVENTION

In accordance with the present invention, a multi-dimensional database includes data organized into hierarchical levels. For each level within a dimension, predefined thresholds are set to determine which intersections are precomputed and which are not. The general result is to precompute intersections which take relatively longer to compute at run time, and to not precompute intersections which can be calculated relatively quickly at run time. When multiple dimensions of data are provided, a step-by-step process uses the level threshold for each dimension to determine whether data is to be prestored at an intersection. An odd-even calculation insures that computations performed at run time are relatively efficient. The technique results in good run time response, while not requiring maximum storage or recalculation time for data updates. By adjusting the thresholds at the individual dimension level, response of the multi-dimensional database can be changed as desired.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 4 is a table illustrating numbers of members at various levels of the dimensions defined in FIG. 2.

FIG. 5 is a table of threshold values to be used with the example of FIG. 4; and FIG. 6 is a pseudo-code definition of an algorithm which implements the preferred method.

DESCRIPTION OF THE PREFERRED EMBODIMENT

The technique of the present invention can be used in different types of multidimensional database systems. It is particularly useful in a MOLAP engine running on any of a number of widely available database engines.

Figure 1:
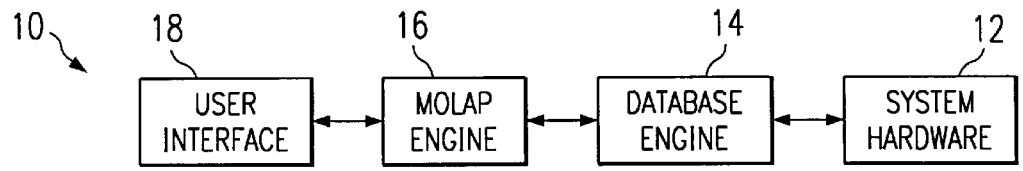
FIG. 1 is a high level block diagram of a database system.

A high level diagram of a typical system on which the software implementing the invention can be run is shown in FIG. 1. The system 10 runs on system hardware 12. System hardware 12 is intended to be representative of both the physical hardware of the computer system, and various operating system and other low-level utilities. A database engine 14 runs on system hardware 12, and can be any engine such as is widely available from numerous sources. A MOLAP engine 16 runs on the database engine 14, and is accessed through a user interface 18. Except for the improvements of the invention described below, each of these pieces can be a generally available component as is well known in the prior art.

The following description includes definitions of some basic terms used in the remainder of the description. Several examples, and the processes of the inventive method, are then described, followed by a detailed description of the operating properties of a suitable MOLAP system in which the invention is preferably practiced.

A dimension is a logical grouping of unique entities that are called members of the dimension. Each of these members is uniquely identifiable. Each dimension is uniquely identified by a name.

A hierarchical dimensional is a dimension whose members are partitioned into named levels. These levels have a partial order imposed on them. The partial order between levels is transitive: If A is related to B, and B is related to C, then A is related to C. Members of any two related levels have a one-to-many relationship defined between them. These levels are called higher (ancestor) and lower (descendant) levels respectively.

If level Y is the ancestor of X, then the relationship between the levels can be represented as Y>X. A parent of a level X is the ancestor level Y where there does not exist a level Z such that Y>Z>X. If Y is a parent of X, X is a child of Y. This relation is a partial ordering, as a level can have both more than one parent, and more than one child. For example, level A can have two children B and C (A>B and A>C), and B and C can share a child level D. (B>D and C>D) In such a case, B and C define parallel paths, and need not be related.

A dimension intersection for a set of dimensions is a set of members where one member belongs to each dimension. An intersection can have more than one member from a single dimension, but for purposes of simplicity, the description below will give examples in which each intersection includes one member from each dimension involved in the intersection.

A data element is preferably treated as a (property, value) pair. The property represents the name of a data measure which results in a value given a member in every dimension that the data depends upon. A data measure, generally, is a property that is dependent on a subset of the defined dimensions. A data measure yields a scalar value at an intersection of its dependent dimensions.

An aggregatable data measure is defined with a lower bound level in each of its dependent dimensions. The data measure can have data values for a subset of intersections of lower bound level members of every dependent dimension. Aggregateable data measures use an aggregation method to generate data for an ancestor level member given data for all its children at one of its descendant levels. An example of an aggregation method is summation, i.e., summing of values in descendant levels to be stored in an ancestor level.

Figure 2:
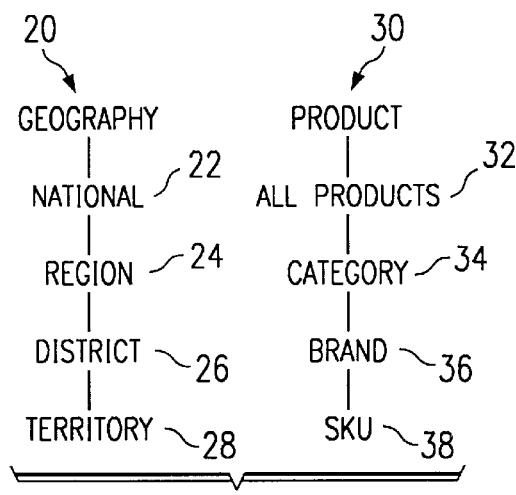
FIG. 2 is a representation of the levels within two database dimensions.

FIG. 2 gives examples of two dimensions which are used in the subsequent description. Geography dimension 20 includes four levels of its members in a hierarchical order: National level 22, region level 24, district level 26, and territory level 28. In a similar manner, product dimension 30 includes four hierarchical levels: All products 32, category 34, brand 36, and SKU (Stock-Keeping Unit) 38.

Figure 3:
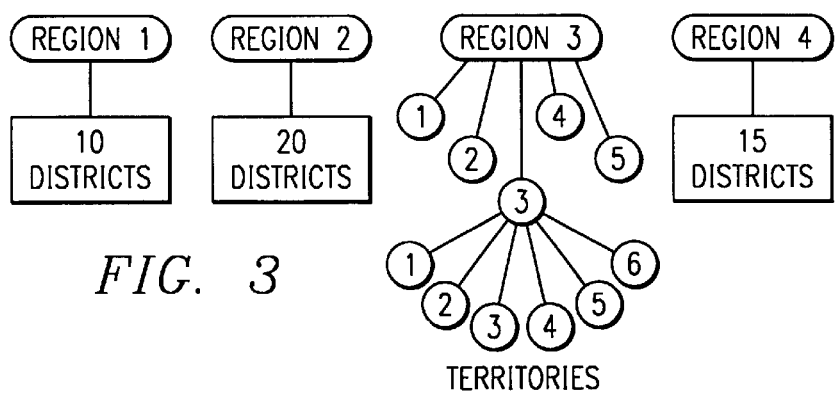
FIG. 3 is a tree diagram illustrating various features of a database structure.

As a simple example, members of each dimension can have a straightforward hierarchical relationship with members of its ancestor and descendant levels. FIG. 3 shows an example in which the region level has 4 members, region 1, region 2, region 3, and region 4. Each region has some number of child districts, which varies by region. In the example of FIG. 3, region 1 has 10 districts, region 2 has 20, region 3 has 5, and region 4 has 15 districts.

Only the five district members of region 3 are individually illustrated in FIG. 3. In addition, only the six territory level members of region 3-district 3 are illustrated. The territories of the remaining districts of region 3, and further remaining districts of the other regions, are not shown in FIG. 3 for simplicity.

In FIG. 3, region 3 is a parent of each of its districts 1, 2, 3, 4, and 5. It is an ancestor, though not a parent, of each of the territories 1–6 within region 3.

In a similar manner, product dimension 30 will have a number of categories, brands, and SKUs. As an example, three product categories could be defined, having 5, 4, and 3 brands respectively. Each brand has a number of SKUs. For the purposes of the following description, FIG. 4 is a table illustrating the number of members at each level for both the geography and product dimensions.

Referring to FIG. 4, within the geography dimension only region 3 is broken out in detail, corresponding with the graph of FIG. 3. The product dimension, having less members at intermediate levels, is shown in more detail. There are a total of 466 members in the geography dimension, and 761 members in the product dimension. Assuming intersections can have only one member from each dimension, this simple database has 354,626 intersections.

For purposes of the remaining description, it will be assumed that an aggregateable data measure of interest is unit sales. Considering the product dimension, actual unit sales are provided at the SKU level. Unit sales may be aggregated, by summing, at the brand category and all products level.

Prior art techniques provide for a knowledgeable user to define which members of the product dimension are aggregated at runtime, and which are precalculated. According to the present invention, members which are precalculated versus those which are calculated at runtime are defined by a threshold value assigned on a level basis. For example, if a member at any given level has more children than the threshold defined for that level, unit sales for all of its descendants will be aggregated and stored within that member. If a member has less children than the threshold, the aggregated data may or may not be stored there as described below.

As is normal in systems of this type, the database contains a dimension table for each dimension. Each entry in the dimension table corresponds to a member of that dimension, and contains various identification, control information, and data for that member. Actual database data is stored in the fact table which, potentially, includes an entry for each intersection in the database. Actual data, such as unit sales and aggregated unit sales, is stored in the data table entries for the corresponding intersections.

To implement the method of this invention, three pieces of information are maintained for every member of a dimension. This information is maintained in the dimension table. These items of information are: a "count" to keep track of the number of descendants required to compute the member, a "flag" which indicates if the member is "stored" or "not-stored", and the child level containing the children to be accessed. This latter item of information is used for hierarchies having multiple child levels, to identify which level to use.

For each member within a dimension, it is necessary to determine whether the aggregateable data, in this case unit sales, is to be stored or not-stored for that member. This is done by comparing the count of each member to the threshold for that level. In general, if the count for a member is greater than or equal to the threshold level, the unit sales data is aggregated and stored for that member. If the count is less than the threshold value, that member is marked as not-stored.

Several examples will be given with respect to the example numbers shown in FIG. 4. FIG. 5 gives a list of threshold values for each level of both the geography and product dimensions. These levels have been set in advance by a user, preferably one who has some idea how setting threshold levels will impact the performance of the database. These threshold levels can be changed at any time by an appropriate administrative user.

As shown in FIG. 5, the territory and SKU levels within the geography and product dimensions, respectively, do not have a threshold value. This is because these levels do not have any child levels, and therefore, all sales data must be stored at these levels. Referring to the product dimension, the threshold for the brand level has been set at 50. This means that any brand having 50 or more SKUs will be precalculated and stored within the brand member. Those having less will not be precalculated unless certain criteria are met as described below. As shown in FIG. 4, none of the three brands in category 3 will be precalculated. Brands 2, 3, and 4 within category 2 will be precalculated, and brands 3 and 4 within category 1 will be precalculated. This saves significant time when reading the database, because these brands, each having a large number of SKUs, contain the precalculated aggregate total of all of their children. This saves significant computation at runtime.

Looking at the categories within the product dimension, category 1 will contain a precomputed unit sales value, because it contains five brands. This will also be the case with category 2. Category 3, at least initially, will not need to be precomputed. In fact, this would remain the case assuming that each of the brands 1–3 within category 3 had a pre-computed aggregate value for unit sales.

However, in the example shown in FIG. 4, the brand members 1–3 within category 3 are themselves not aggregated. Thus, in order to calculate unit sales for category 3, it will be necessary to traverse the tree down to the SKUs for each of brands 1–3 within category 3. This is a total of 40 SKUs, plus 3 brands, giving 43 nodes which must be traversed to compute unit sales for category 3. In this case, sales for category 3 would be precomputed because 43 is greater than the threshold level of 4. If the threshold level for categories had been set at 50, no precomputation would take place for either category 3 or brands 1, 2, and 3.

Further, if the category threshold had been set at 50, category 2 would not be precalculated. This is because each of brands 2, 3, and 4 in category 2 was precalculated, giving each of these brands a count of 1. Brand 1 on category 2 is not precalculated, and has a count of 10. Therefore, the total count for category 2 would be 13, less than a threshold of 50.

If the category threshold were 50, category 1 would still be pre-computed, because only brands 3 and 4 within category 1 are precomputed. Brands 1, 2 and 5 are not precomputed, giving category 1 a count of 10+20+1+1+35= 67. Any category threshold less than 67 caused category 1 to be pre-computed.

FIG. 6 is a psuedo code definition of the algorithm used to determine whether the flag for any particular member is marked as stored or not-stored. Initially, if the level does not have any child levels, all members have the flag marked as stored. If the level does have any child levels, each member of that level must be considered separately. A nested series of loops is used, as shown, to traverse the nodes of the various levels and determine whether the flag for each member is set as stored or not-stored.

For each member, for every child level of that member, the member's count is initially set to 0 and then incremented for every member of the child level. If the child's flag is stored, one is added to the current member's count. If the child's flag is not-stored, the child's count is added to the current member's count. The minimum computed count for all of the different child levels (and there will be only one in a simple hierarchical example such as shown in FIG. 4) is stored in the count entry for that member. If that count is greater than a threshold value for that level, the flag is marked as stored, otherwise it is marked as not stored. The level which yields this minimum count is stored as the child value for that level.

Operation of this algorithm can be seen with respect to FIGS. 3 and 4. Assume that the level currently under consideration is the region level of the geography dimension. For member region 3 of this level, there are five children. Initially, the count of Region 3 is set to zero. Then for each of members 1 through 5, a determination is made as to whether the flag for that child is stored. Given the thresholds shown in FIG. 5 for the geography dimension, the stored flags are marked for children 1, 3 and 4, because these children have four or more territories in the threshold as four. For each of these children out of Region 3, one is added to account for Region 3.

Of the remaining two children of Region3, Districts 2 and 5, the flag is marked as not-stored. For these two children, the count of each child is added to the count of Region 3. For District 2, the count is 2, and for District 5 the count is 1. This give a total count for Region 3 of 6.

Because, through the algorithm of Figure of 6, the minimum count of 6 is stored, and is compared to the region threshold of 10. Because 6 is less than 10 the flag is marked not stored. Also, the level which yields this count is district, so a pointer to the district level is stored as the child pointer for Region 3.

This looping algorithm is applied to every member of each dimension. As described further below, it is not applied to intersections of dimensions, but only to the members of the dimensions themselves.

If the data scheme is one dimensional, for example only the geography division existed within the database, the storage scheme for precomputed data within the database is simple. Data is not stored at the members marked not-stored, and it is stored at members whose flag is marked as store. When accessing unit sales at runtime, if a member with a not-stored flag is encountered, the members of the child level are used to compute the sales numbers for the member of interest. If any of the children are also marked not-stored, its children are checked in a recursive arrangement.

Important space savings of the present invention are primarily achieved, however, when this approach is extended to multiple dimensions. It is not necessary to keep a stored/not-stored flag for every intersection within the database; it is only necessary to keep this information for once for each member of each dimension.

The algorithm for the multi-dimensional case is described in the following paragraphs. Consider a data measure M dependent on n dimensions D1, D2. Dn ... M is a subset of the cross product of the dimensions D1, ..., Dn. Each member of M is a n-tuple where each component of the tuple belongs to one of the dimensions. As described above each such component is marked stored or not-stored by the method described above.

There are two cases to be considered:
  i) The number of components of an intersection marked not-stored is even
    a) The number of components marked not-stored is zero
      The intersection is stored and is directly accessed
    b) All the components marked not-stored have a count of 1
      The intersection is not stored in the data measure. When the intersection is accessed, the system navigates down all the dimensions containing the components marked not-stored. The child level of each component described above is used for the navigation. Since the count is 1 for all components, only one child marked stored will be found in each dimension. All components are replaced with members of the corresponding dimensions that are found (marked stored). The intersection thus formed is accessed (case a above).
    c) At least one of the components marked not-stored have a count greater than 1
      The intersection is stored and is directly accessed
  ii) The number of components of an intersection marked not-stored is odd
    The intersection is not stored in the data measure. When the intersection is accessed, the dimension containing the component marked not-stored with the minimum count is selected. The system navigates down the dimension making use of the child level information and collects all the members marked stored. The number of such members equals count. The component of the original intersection is replaced by each of the members collected forming count intersections. Each intersection thus formed has one less component marked not-stored making the number of not-stored components even. These intersections can be accessed using the methods described in case i above using which the original intersection can be computed.

In a system with n dimensions D1, D2, . . . Dn with number of members M1, M2, . . . Mn respectively, this scheme uses additional space proportional to M1+M2+ . . . +Mn but saves space proportional to M1 * M2 . . . Mn (the unstored intersections). This scheme guarantees that the number of intersections accessed to calculate the data at an intersection does not exceed the maximum of the thresholds associated with the levels to which the components of the intersection belongs.

In the example used in this description, with two dimensions, there are four possibilities for an intersection, because there are two members for the intersection, with each member having two states for its flag. The possibilities are for both members' flag to indicate stored, both indicating not-stored, and one flag indicating stored with the other indicating not-stored (two instances).

As described by the multi-dimensional algorithm, if one member is marked stored while the other is marked not-stored, the data measure (unit sales) is not stored at that intersection. If both members are marked stored, the number of not-stored flags is 0, the unit sales data measure is aggregated and stored at that intersection. If both components are marked not-stored, whether the data measure is stored at that intersection will depend upon whether or not either of the component members have a count greater than one. If at least one of them does, the data is aggregated and stored at that intersection. If both have a count of one, the data is not stored at that intersection.

As an example, consider the two dimensional example of FIGS. 4 and 5. One intersection is that of category 3 with region 4. Unit sales for this intersection represents unit sales of category 3 products in region 4. To determine whether sales data is to be aggregated and stored at this intersection, (i.e., an entry for this intersection is made in the data table), the flags for region 4 and category 3 are examined. Both members are marked stored, meaning there are zero not-stored flags. Therefore, unit sales data is stored at this intersection. It is not necessary to provide a flag for this intersection because, its status is determinable from the flags of its two members.

Now, assume that the threshold for the category level was changed to 50, as described previously. In this case, category 3 would be marked not stored. The intersection of category 3 and region 4 now has an odd number of not-stored flags (1 flag marked not stored), so no unit sales data is stored at that intersection. When this number is needed, a runtime calculation is performed. As described above, this determination is made based only on the flags of the members included in the intersection. Thus, no flags are needed for the numerous possible intersections, and no data will be stored (i.e., entries made in the data table) for many of such intersections, thereby saving storage space.

The alternating effect caused by using odd or even numbers of not-stored flags to control whether data is stored at the intersection helps ensure that no runtime searches take too long. If data is not stored at an intersection, only a relatively small number of steps will need to be followed in order to meet the aggregation (e.g., summation) of the data needed to define that intersection.

Although the algorithm described above of setting thresholds and traversing nodes of a database tree can be applied to different database designs, the preferred embodiment is more completely defined to have particular characteristics. The characteristics of principal importance are now described as a set of properties for elements of the database, with some examples given to illustrate them.

Dimension

Description

A dimension is a logical grouping of unique entities that are called members of the dimension. Every member of a dimension has a code and a description associated with it. Dimensions have a unique name and any number of unique aliases associated which can be used to refer to it.

Example

Geography dimension has members Eastern Region, Western Region, New York Territory and so on.

Dimension Intersection

Description

A dimension intersection for a set of dimensions is a set of members where one member belongs to each dimension. An intersection can have more than one member from a single dimension. Each of these dimensions needs to be identified with a unique alias name.

Example

[Brand Cookies, Region Eastern, January 95] is one intersection of the [Product, Geography, Time] dimension set.

Data

Description

A data element can be viewed as a (property, value) pair. Property represents the name of a data measure which results in a value given a member in every dimension that the data depends on. The data may not require identification of members in all defined dimensions. Dimensions on which the data measure depends are called dependent dimensions and those on which it does not depend are called independent dimensions. Data can depend on the same dimension more than once in which case multiple positions of the dimension need to be identified to obtain the data values.

Dimensions can be classified as sparse or dense depending upon availability of data elements. A dense dimension has meaningful data for a subset of its members irrespective of the members of the other dimensions. A sparse dimension is one where the availability of a data element depends on members of the other dimensions. Sparseness or density of a dimension can vary by data element.

Example

Unit Sales, Price are all data measures. (Unit Sales, 1000)—identifies the value for Unit Sales at Eastern Region, Cookies Brand and Q1-1997. Unit Sales depends on Geography, Product and Time. Whereas Price is dependent on Product and Time and is independent of Geography. Time is a dense dimension for the measure Unit Sales and sparse dimension for Price.

Hierarchical Dimension

Description

Members of a hierarchical dimension are partitioned into named levels. These levels have a partial order imposed on them. The partial order between levels is transitive: If A is related to B, and B is related to C, then A is related to C. Members of any two related levels have a one-to-many relationship defined between them. These levels are called higher (ancestor) and lower (descendant) levels respectively.

If level Y is the ancestor of X, then Y>X (read as, "Y is ancestor of X"). A parent of a level X is the ancestor level Y where no level Z exists such that Y>Z>X.

In case of sequenced dimensions, a sequence is imposed within the members of a level. If a sequence is imposed on multiple levels of a dimension, the sequence needs to be consistent across the levels. In other words, if sequenced level X is an ancestor of sequenced level Y and member x[1] of level X is before member x[2], then any y[i] which is a child of x[1] is before any y[j] which is a child of x[2].

Every level in a dimension can have user specified thresholds which are used to determine the storage strategy of aggregatable measures. The system keeps track of the minimum number of child members that need to be accessed to compute data at every member of a dimension. Every member is flagged "to be stored" if the count is more than the upper threshold and "not to be stored" if the count is less than the lower threshold. The flag is changed to "to be stored" when the count goes above the upper threshold and to "not to be stored" when the count goes below the lower threshold.

Example

Quarter and Month are names of levels of the Time Dimension. Region and District are names of levels of the Geography Dimension.

Product Dimension can have All Products, Brand, Size and SKU as levels with the order All Products>Brand, Brand>SKU, All Products>Size, Size>SKU. All Products is higher than Brand and Brand is an ancestor of SKU. Brand and Size are not related to each other. Members of Size could be Big, Medium and Small.

The Cookies Brand is a member of level Brand and is the parent of Chocolate Chip, Oatmeal Raisin and Macadamia Nut SKUs.

The month is a sequenced level of dimension Time and may have members January 95 . . . December 96 with a system recognized sequence. Quarter is an ancestor of Month and is sequenced. If Qtr1 is before Qtr2 then all months in Qtr1 are before all the months in Qtr2.

Aggregation Path

Description

Given a member x of a level X, there exists a member y related to x in every ancestor level Y of X. This is called the set of ancestor members of x. The members in the ancestor set of x may or may not be related to each other.

Aggregation path of member x, is defined as a subset of ancestor members of x that have a total order imposed on them. In other words, every pair of members in the aggregation path are related to each other.

Example

In the hierarchical dimension example, one aggregation path for Chocolate Chip cookies contains Cookies Brand and All Products (the only member of the All Products level).

Multiple Hierarchies or Multiple Aggregation Paths

Description

Each member can have more than one aggregation path to facilitate grouping by different attributes which are members of unrelated levels.

Thus a member can have multiple parents resulting in multiple hierarchies in a dimension.

Example

SKU can be grouped by Brand or Size. The two aggregation paths for a member of the SKU level are Cookies Brand-AllProducts and Big-AllProducts. The parents of Chocolate Chip (SKU) could be Cookies (Brand) and Big (Size). The two hierarchies of the Product dimension are AllProducts-Brand-SKU and AllProducts-Size-SKU.

Split Dimension

Description

A dimension can be split in such a way that different levels can be independently selected to identify a data element.

Splitting is done by selecting a level X as one of the dimensions. The uniqueness of this dimension will remain the same. All the levels of the original dimension which have X as one of their ancestors form the new dimension and the relations among these levels remain unchanged. The uniqueness of the newly formed levels is obtained by subtracting the uniqueness of X from their original uniqueness. Dimensions can be split at run-time. Split dimensions can be split further.

Example

January 1995 could be defined as an unique member of the level month of Time Dimension. Another way to define it is as member January of level Month and a descendent of member 1995 of level Year. If the latter method is used to define the Month and Year levels, then the Time dimension can be split between Year and Month and viewed in a spreadsheet with Month going down (rows) and Year going across (columns).

Combined Dimension

Description

A Combined dimension is a combination of two or more dimension. All members of the Cartesian product of the dimensions to be combined are members of the combined dimension. Two levels of a combined dimension are related if one component of one of the levels is related to the corresponding component of the second level provided all the other components match. A combined dimension can be defined at run time and is uniquely identified by a name.

Example

Consider two dimensions defined by a partially ordered set of levels. Let {A1, A2, A3, A4} be the levels of dimension A and {B1, B2, B3, B4} be the levels of dimension B. Then the set of levels {A1B1, A1B2, A1B3, A1B4, A2B1, A2B2, A2B3, A2B4, A3B1, A3B2, A3B3, A3B4, A4B1, A4B2, A4B3, A4B4} is the new formed combined dimension.

If A1>A2 then A1X>A2X for all X belonging to dimension B.

Uniqueness

Description

Every member of a level is identified using a code. The member code may not be unique by itself but requires to be unique within the dimension when qualified by all its ancestor member codes. The uniqueness of a level is the set of all its ancestor levels.

Example

In the split dimension example, the code assigned to January could be 01, February—02, Year 1995—95, Year 1996—96, and so on. To uniquely identify Month January of Year 1995, the combined code of Month and Year which is 9501 is needed. The uniqueness of level Month contains the Month and Year Adding Dimension Members Description Dimension members can be loaded at any level by specifying all the components of the uniqueness of the level. The system will add the ancestor members to all ancestor levels if required. In other words, all members of a dimension need to have all their ancestors defined but need not have their descendants defined. Adding dimension members is a multi-user operation and is available to every user with the required access.

Consolidated Level

Description

A consolidation of a level X within an ancestor level Y is defined as the set of unique members that result by adding level X to the uniqueness of Y and applying the resulting set to level X. The members of the new level Z thus formed are assigned new descriptions and the level has the following relations:

Y>Z

Z>X

A consolidation of a level X can also be defined as the set of unique members within X. The uniqueness of the new level Z will contain itself only. In this case, the new level Z has the following relation:

Z>X

Consolidated levels are definable at run-time. Consolidated levels can be used in all operations where a pre-defined level can be used.

In case of aggregatable data measures, the defined aggregation method is used to compute data at the members of the new level. In case of non-aggregatable measures, the default access method defined for the measure is used to generate data.

Example

If all the corresponding months of every year are assigned the same code (code of January is 01 in years 1995, 1996 and 1997 and so on) then a consolidated level called "Consolidated Month" could be defined at run-time for level Month within the AllYears level to compare data by months across all years. The data for January will be an aggregation of January 1995, 1996, 1997 and so on.

The uniqueness of the Month level is {AllYears, Year, Month}. The uniqueness of Consolidated Month is formed by adding Month to the uniqueness of AllYears: {AllYears, Month}

Custom Level

Description

A custom level of a level X within an ancestor Y is defined by merging sub-groups of members of X that are related to a single member of Y. This could be performed for multiple members of Y. The members of new level Z thus formed are assigned new codes and descriptions and the level has the following relations:

Y>Z

Z>X

Custom levels can also be defined on level X without being bound by an ancestor level. In this case the new level defined Z has the following relation:

Z>X

Custom levels are definable at run-time. Custom levels can be used in all operations where a pre-defined level can be used.

In case of aggregatable data measures, the defined aggregation method is used to compute data at the members of the new level. In case of non-aggregatable measures, the default access method defined for the measure is used to generate data.

Example

A new grouping attribute called Packaging could be added to the Product dimension at run-time. To do this a custom level called Packaging could be defined from SKU within the ancestor level Size by combining SKUs of similar packaging into one member. Chocolate Chip and Macadamia Nut could be combined into one member of the Packaging level and Oatmeal Raisin could form another Packaging member.

Custom Group
Description
Custom group is a subset of members of dimension. Custom groups can be defined by arbitrary selection, tree, or using expressions on data measures dependent on this dimension alone.

Tree is defined by a position p (level member), a level S related (ancestor or descendent) to the level of the position x where the tree starts and a descendent level E of the start level where the tree ends. The level S can be above or below the level of the p. The custom group contains all members that are related to p belonging to the levels X such that X is the same as or a descendent of level S and is the same as or a an ancestor of level E.

Set of trees or Range of trees are example of a Custom Group.

Custom Scope
Description
Scope is a set of non-overlapping members of a dimension. Two members of a dimension are non-overlapping if they do not have any common children (other members of the same dimension belonging to the descendent levels).

Set of members of a level and Range of members of a sequenced level are examples of scope.

Data Measure
Description
A data measure is a property that is dependent on a subset of the defined dimensions. The subset of dimensions on which a data measure is dependent is called its Dimensionality. Dimension aliases can be used if a data measure is dependent on the same dimension more than once. In other words, specification of more than one position of such dimensions is needed to access the data stored in the measure.

Data measure yields a scalar value at an intersection of its dependent dimensions. The scalar value is undefined if the intersection is not stored subject to access methods discussed below. The intersection of a subset of dependent dimensions results in a multi-dimensional array of values where the axes represent the dimensions that are not part of the intersection.

There are two kinds of data measures: Aggregatable and Non-aggregatable.

Another categorization for data measures storing numeric values is Signed and Unsigned where Unsigned data measures can not accept negative numbers. In case of signed data measures negative numbers can be locked and locking an intersection does not prevent negative number storage in the measure.

Example
Unit Sales, Price, Actual Dollars, Forecast Units are all data measures.

(Unit Sales, 1000)—identifies the value for Unit Sales at the intersection [Eastern Region, Cookies Brand, Q1-1997].

The intersection [Eastern Region, Cookies Brand] results in a one-dimensional array of scalar values for all the time dimension members.

Data Type
Description
The type of the scalar value to be stored at an intersection for a given data measure could be one of Numeric (specified as maximum number of digits stored and implied number of decimal places), Integer (maximum number of digits and implied number of trailing zeros not to be stored), Boolean, String & BLOB (Binary Large Object). A Reference data type will also be supported to store references to application objects.

Example
Price can be defined as Numeric with a maximum of 5 digits (decimal point not included) and 2 decimal places. Price is stored in cents and divided by 100 while reading.

Revenue can be Integer with 5 digits stored and 3 trailing zeros not stored. In other words, Revenue is stored in thousands and a multiplication factor 1000 is applied while reading.

Unit Sales can be defined as Integer with a maximum of 10 digits.

Comments can be defined as BLOBs where any binary object (pictures, documents etc.) can be stored at dimension intersections.

Aggregatable Data Measure
Description
An aggregatable data measure is defined with an anchor (lower bound) level in each of its dependent dimensions. The data measure can have data values for a subset of intersections of lower bound level members of every dependent dimension. It also has values defined for all intersections in all the aggregation paths of the lower bound level members.

Optional levels called the "aggregation termination" levels can be specified for every dependent dimension. These levels should be same as or ancestors of the lower bound level. Only those intersections along the aggregation paths that contain members of the aggregation termination (upper bound) levels are defined. The intersections containing members of ancestor levels of the aggregation termination levels are not defined.

Aggregatable data measures use an aggregation method to generate data for an ancestor level member given data for all its children at one of its descendent levels. Examples of aggregation methods are sum, weighted average, min, max, or, and etc. In case of weighted average, a summarizable data measure is needed to provide weights.

Aggregatable data measures can only have data of types Numeric, Integer or Boolean and the aggregation integrity is maintained by the system.

An incremental aggregation method is one which can be used to compute the value at the parent knowing the old value of the parent, old value of the child, and the new value of the child when one of the children is changed. This lets us compute the parent value by accessing only the changed children. Sum and weighted average are examples of incremental aggregation methods.

If an odd number of dimension components of an intersection x, are flagged "not to be stored" (see section Hierarchical Dimension), the intersection is not stored. Otherwise, the intersection is stored. If an intersection within the defined bounds of a data measure is not stored, access routines will compute the value at run time from the children positions.

When a "to be stored" intersection becomes "not to be stored", the intersection is immediately flagged deleted and is not accessed. On the other hand, when a "to be stored" intersection becomes "not to be stored", it is added when the intersection is needed.

Example
Unit Sales could be defined as a summarizable data measure dependent on. Product and Geography dimensions with SKU and Region as the anchor levels. If the Unit Sales data values for [Chocolate Chip, Eastern Region], [Oatmeal Raisin, Eastern Region] and [Macadamia Nut, Eastern Region] intersections are 100,200 and 300 respectively, then system should ensure that the value at [Cookies Brand, Eastern Region] intersection is 600.

If the aggregation termination level is not specified, then intersections corresponding to the level combinations [Size, Region] and [AllProducts, Region] will be generated.

If the aggregation termination level is specified as Brand in the Product dimension then the combinations of [Size, AllProducts] will not be generated.

Allocatable Data Measure

Description

An allocatable data measure is an incrementally aggregatable data measure which has a dis-aggregation method defined. Dis-aggregation is the process of arriving at unique children values given a parent value and a profile (set of basis values).

Allocatable data measures can only have data of types Numeric, Integer and support aggregation methods: sum and weighted average.

Updating an Allocatable Data Measure

Description

When a data element is modified at an intersection, the change needs to be distributed down to the anchor level intersections within its scope based on a pre-defined criterion. The change also needs to be propagated to all ancestor member intersections of all defined aggregation paths for the data measure.

Update of anchor level intersections by multiple users/threads should be sequential, such that no two intersections common to any two update scopes are hit in different sequence. If intersection A and intersection B are in the update scopes of thread T1 and thread T2 and if T1 changes intersection A first, T1 should change intersection B also first and vice versa. This will result in one of the updates completely overriding the other and the end result will be consistent with at least one of the updates when the scopes overlap.

An online re-synchronization operation is provided since incremental update can only preserve "aggregation integrity" if it is a pre-condition.

An update operation can have the following parameters for each dependent dimension: A scope, an input level (below the level of the scope) at which the external input is obtained. A level combination sequence to follow (sequence needs to monotonically progress towards the lower bound level combination) during the allocation can be defined if an application provided basis needs to be used for allocation along the path. A default data base specified basis is used beyond the specified path to reach the lower bound combination.

Example

In the aggregatable data measure example, if the Unit Sales data element corresponding to the [Cookies Brand, Eastern Region] intersection is changed from 600 to 900 the new values for [[Chocolate Chip, Eastern Region], [Oatmeal Raisin, Eastern Region] and [Macadamia Nut, Eastern Region] intersections should be 150, 300 and 450. The pre-defined criterion in this example is "preserve the existing proportions".

The update to the [SKU, Region] intersections also causes the data elements corresponding to the [Size, Region] intersections to be updated because the members of the Size level fall in the relevant aggregation path for SKU.

If multiple users attempt to change the values for any of the intersections at [SKU, Region], the values at the [Brand, Region] intersections should be the sum of the [SKU, Region] intersections after the operations are complete and no other updates are being performed on the data measure.

Non-Allocatable Data Measure

Description

A Non-allocatable data measure is an aggregatable data measure with no dis-aggregation allowed. In other words, all updates are performed at the lower bound level combination and aggregated to higher levels. Aggregation is performed without assuming any pre-existing aggregation integrity and requires accessing all children of each node affected by an update.

Non-allocatable data measures can only have data of types Numeric, Integer and Boolean and support the aggregation methods: max, min, and, or etc. User defined aggregation can defined for pre-defined types.

User defined data types with user specified operations are supported. The operation should include a pre-defined aggregation method which is used to perform the aggregations along the dimensions. A user defined operation can be performed on a custom group of intersections.

Updating a Non-allocatable Data Measure

Description

A Non-allocatable data measure can only be modified at the lower bound level combination directly. The change is then propagated upwards using the aggregation method to all the parent nodes.

Update of all intersections by multiple users/threads should be sequential, such that no two intersections common to any two update scopes are hit in different sequence. If intersection A and intersection B are in the update scopes of thread T1 and thread T2 and if T1 changes intersection A first, T1 should change intersection B also first and vice versa. This will result in one of the updates completely overriding the other and the end result will be consistent with at least one of the updates when the scopes overlap.

An update operation needs to have just a scope specified for each dependent dimension. The external input is obtained at the lowest level and the data measure is updated.

Non-Aggregatable Data Measure

Description

A non-aggregatable data measure can have data at a subset of intersections of its dependent dimensions. Data at each intersection is independent of the data at other intersections. In other words, there is no "aggregation integrity" that needs to be maintained for non-aggregatable data measures. Updating a value for the non-aggregatable item updates the data element at the current intersection.

Users can add or delete any intersection subject to access restrictions. If an intersection does not exist, a higher level intersection is accessed. This is repeated in a user specified order until an intersection is found. On the other hand, update operation is performed only if the intersection exists.

Non-aggregatable data measures can have any of the data types listed in the data type section. User defined data types with user specified operations are supported. A user defined operation can be performed on a custom group of intersections.

Example

Price, Seasonally are non-aggregatable data measures.

Seasonality can be defined as a non-aggregatable data measure at [Brand, Region], [SKU Region] and [SKU Territory] level intersections.

Price can be defined as a non-aggregatable data measure at [SKU Region] level intersections. The access order could be defined as just Region. This will retrieve valid data from the Region level for all intersections at all descendent levels of Region. Data is not available at ancestor levels of Region and SKU.

Updating a Non-Aggregatable Data Measure
Description

All positions in a non-aggregatable data measure are independently update-able. A custom group can be specified for every dependent dimension. All existing intersections of the members of custom group are independently updated using application supplied data.

Data Cube
Description

A data cube is a set of similar data measures (all allocatable, all non-allocatable or all non-aggregatable) with the same dimensionability. A subset of the dimensions of the cube can be designated as dense.

A subset of all possible combinations of the rest of the dimensions is identified for the cube. The storage or non-storage of an intersection is defined by the types of data measures stored in the cube.

If the cube contains a non-aggregatable data measures, a custom group of members of each dense dimension is identified and all the intersections of these custom groups are stored in the cube.

In case of a non-allocatable data measures, a scope of members at the lower bound level of each data measure is identified for each dense dimension and all intersections of these scopes are stored in the cube. In other words, only the lowest level data is stored and higher levels are generated at run time.

In case of allocatable data measures, a scope of members at one of the levels at which the data measure is defined is identified for each dense dimension and all intersections of these scopes are stored in the cube. All the levels at which the data measure is defined, and are reachable from the stored level either through aggregation or dis-aggregation, are generated at run time.

What-If Update
Description

Any update operation can be saved as a what-if update without commit. The what-if update when active acts as a filter applied to the actual data that is retrieved. The data resulting will appear as if the update was committed to the database.

The what-if update can be committed if required.

This will only be implemented if the performance of a what-if update is better than a regular update (commit).

Example

In the updating aggregatable data measure example if a what-if update of 900 is saved to the [Cookies Brand, Eastern Region] intersection, the actual data in the database corresponding to this intersection will still be 600 whereas when the what-if is applied it will appear as if the data is 900. The data at the [Chocolate Chip, Eastern Region] intersection will appear to be 150 even though it really is 100.

Locking a Dimension Intersection
Description

Locking a dimension intersection of an allocatable data measure should keep the value stored at the intersection unchanged while distributing the data from a higher level or propagating the change from a lower level.

Locking a dimension intersection of a non-allocatable data measure is equivalent to locking all the lower bound intersections within the scope of the locked intersection.

Locking/unlocking an intersection of a non-aggregatable data measure is treated as locking a single intersection. In other words, updates will skip the locked intersection.

Example

In the aggregatable data measure example, it the Unit Sales data element corresponding to the [Chocolate Chip, Eastern Region] intersection is locked at 100 and if data element at [Cookies Brand, Eastern Region] intersection is changed from 600 to 900 the new values for [Oatmeal Raisin, Eastern Region] and [Macadamia Nut, Eastern Region] intersections should be 320 and 480. The existing proportions of the unlocked intersections are preserved while keeping the value at the locked intersection unchanged.

Mapping Dimension Members
Description

Members of two dimensions, target and source, can be mapped to each other. Target and source can be defined using aliases and can refer to the same defined dimension. Mapping defines the source members used to compute a target member and is used in Relations and Virtual Data Measures.

Mapping can be defined using a relative definition: ancestor, children, siblings etc. Mapping can also be defined by enumerating the source target pairs.

Relation on a Data Measure
Description

A relation can be defined on a "target" data measure by associating an expression with it. The expression can contain one or more "source" data measures. Each data measure involved in the relation (including the target) has a dimensionality defined using aliases. The dimensionality of the target and source measures need not be the same. In other words, different aliases can be used for different measures to specify dimensionality. For each source dimension that do not match a target dimension (matching is by name and not by the defined dimension it refers to), the members of one of the target dimensions will need to be mapped to the members of the source dimension.

The relation expression can contain constants, source data measures, unary, binary and aggregation operators which are pre-defined. Aggregation operators are needed when a single target dimension member is mapped to multiple source dimension members. The relation definition also specifies whether the relation triggering is manual or automatic.

In case of automatic triggering, the relation triggering is transitive. In other words, if A is a source of a relation on B and B is a source of a relation on C and both are triggered automatically, both B and C are updated when A is modified. Cycles are detected by the system when the relations to be executed are being collected: if the target of a relation to be triggered is involve (either as source or target) in the relations already in the list of relations to be executed, then this relation is not added to the list.

Relation updates are non-incremental and all source positions required to compute a target position are accessed. Since any arbitrary expression can be used and reverse relations cannot be verified by the system, relation integrity is not guaranteed by the system.

If the target is an allocatable data measure, a level is identified for each dimension of the target at which the relation is computed. In case of non-allocatable data measures, the anchor level is used for computation. In case of non-aggregatable measures, all intersections are independently computed.

Example

The Units data measure could have a relation defined on it with the expressions (GrossDollars/Price; GrossTons/Weight). Every update to the GrossDollars, Price, GrossTons or Weight data measures will re-calculate the Units data measure.

Virtual Data Measures

Description

Virtual data measure is a data measure which has no storage of its own, and its value at an intersection is computed at run time. It is non-modifiable. Each virtual measure is defined by an expression which is used to compute its value. The expression can contain constants, stored data measures, unary, binary and aggregation operators which are pre-defined. Expressions cannot contain other virtual measures.

The dimensionality of the virtual and stored measures need not be the same. Aliases can be used to refer to the same internal dimensions and each alias is treated as a different dimension for access. For each dimension of the stored data measure (source dimension) that do not match a dimension of the virtual measure (target dimension), the members of one of the target dimensions will need to be mapped to the members of the source dimension. Aggregation operators are used when a single target dimension member is mapped to multiple source dimension members.

Dimension Member Realignment

Description

Members of hierarchical dimensions can be realigned in one of the following two ways:

1. Moving: A subset of parents of a member of a dimension can be changed. The whole subtree under the member is moved from one set of parents to another set. The member specification can include a subset of its uniqueness thus moving multiple members possibly merging them into one target member. The target member specification can include a different subset of its uniqueness. The data corresponding to all the intersections that contain the moved member is moved.
2. Deleting: An existing member can be deleted. The whole subtree under the member is deleted. The member specification can include a subset of its uniqueness thus deleting multiple members. The data corresponding to all the intersections that contain the deleted member is voided.

An option to reject the operation is provided if the dimension member specification identifies multiple members of the dimension. All data measures depending on the realigned dimension are impacted.

The realignment operation should preserve the aggregation integrity of all aggregatable data measures. When deleting existing members, the system should ensure that there are no existing intersections for aggregatable data measures that do not have corresponding anchor-level intersections.

Realignment may require exclusive access to the data base and may be allowed only by the administrative client.

Example

Consider the geography dimension with levels: National, District, DC, Account. The relations defined are: National>District, National>DC, DC>Account and District>Account. The uniqueness of Account is {DC, District, National}.

If the Account realignment specification is Move Account=Kmart from DC=New York and District=GreatLakes to District=TriState. All Kmart accounts belonging to NewYork(DC) and GreatLakes(District) are moved to New York(DC) and TriState(District).

If the Account realignment specification is Move Account=Kmart from DC=New York to DC=Michigan and District=TriState. All Kmart accounts belonging to NewYork(DC) and any District are moved to Michigan(DC) and TriState(District).

If the Account realignment specification is Move Account= Kmart from DC=New York to Account=Walmart and District=TriState. All Kmart accounts belonging to NewYork(DC) and any District are moved to WalMart (Account) within New York(DC) and TriState(District).

Moving Data Measure Intersection

Description

The dimension intersections within Data Measures can be realigned. The source and target specifications can contain different subsets of dimensions. A subset of data measures dependent on the superset of the union of the source and target dimension sets can be realigned. The dimension specifications are the same as in case of Dimension Member Realignment.

If a dependent dimension of an Aggregatable data measure is not specified, all its members at the anchor level are considered as part of the source specification. If a dependent dimension of a Non-aggregatable data measure is not specified, all its members are considered as part of the source specification.

In case of Aggregatable Data Measures, the subtrees under all the intersections are moved along with the intersections. Otherwise, only intersections specified are moved. Dimension members may be added, but are never deleted.

Example

UnitSales is an Aggregatable Data Measure dependent on Geography, Product and Time and Price is a Non-aggregatable data measure dependent on Product, Customer and Time.

If an intersection of Product and Time is to be moved and the target specified contains the member of Product dimension alone, both UnitSales and Price or either one of them can be realigned. In case of UnitSales, the subtree under the Product part of the intersection is realigned for the given Time for all Geography positions. In case of Price, Product part of the intersection (not the subtree) is realigned for the given Time for all Customer positions.

If an intersection of Geography and Product is to be moved and the target contains intersections of Geography and Time dimensions, only UnitSales can be realigned. The subtree under the Product part of the intersection is realigned for the given Geography, and all Time members of the level specified in the target are realigned into one specified Time member and the subtrees under the all members are merged under one.

Deleting Intersections from Data Measures

Description

The intersection specification can contain a subset of dimensions. The intersections can be deleted from a subset of data measures who dimensionality includes all dimensions in the specification. The dimension specifications are the same as in case of Dimension Member Realignment. All intersections within the selected data measures matching the specification are deleted.

If a dependent dimension of an Aggregatable data measure is not specified, all its members at the anchor level are considered as part of the specification. If a dependent dimension of a Non-aggregatable data measure is not specified, all its members are considered as part of the specification.

In case of Aggregatable Data Measures, the subtrees under all the intersections are removed along with the intersections. Otherwise, only intersections specified are removed.

Security

Description

An object storage model is to be defined for OLAP. Access permissions can be set for each object (Dimensions, Levels, Members, Data Measures, Data at cell level) by user, group etc. The access privileges can be Read, Modify, Add, Delete, etc.

Distributed OLAP
Description

The distribution of data is done subject to the following guidelines:

Separate the dimension view exposed to the applications from the data storage

Store data such that all updates, locking can be performed without having to access data from other sub-cubes Provide mechanisms to minimize cross sub-cube data access while computing relations and virtual data measures Multi-dimensional data can be distributed into sub-cubes along a dimension. Each sub-cube can be further distributed along the same or a different dimension.

The following are the two ways of distributing sub-cubes along a dimension:

1) Partitioning the levels of a dimension

The levels are partitioned into two sets with one of the levels belonging to both sets. All paths from a level belonging to one set to a level belonging to the second set need to pass through the common level. In a set, if a level is a parent(child) of the common level, there does not exist a level in the set which is a child(parent) of the common level.

2) Partitioning the instances of a dimension

The partitioning of the instances is done at a level which is a parent of all levels in the sub-cube being partitioned. In other words, it is the highest level of the sub-cube. All levels belong to both sub-cubes.

A sub-cube can also be partitioned by data measures also. Relations and virtual data measure definitions cannot span multiple sub-cubes when the partitioning is done by data measures.

All data access is synchronous. If the process servicing a sub-cube is down, the data cannot be accessed.

Propagation of updates may need to be asynchronous. Even if the process servicing the sub-cube is down, the data needs to be guaranteed to be updated eventually.

The allocation paths are restricted such that the lowest level of each sub-cube is in the allocation path, if the allocation path spans multiple sub-cubes. This is required to limit the allocate and following aggregation operation to a sub-cube.

Configuration
Description

All programmed limits: number of dimensions, number of data measures, number of levels, number of concurrent users etc. should be configurable. In other words, these limits should be modifiable without recompiling the system.

In summary, the method of the present invention involves setting threshold values for different levels within a multi-dimensional database having data organized into hierarchical levels. By determining whether to aggregate selected data measures for each intersection of the database, following rules related to these threshold values, database access is rendered reasonably efficient while not requiring a worst case maximum storage size. Because it is relatively easy to adjust these threshold levels, it is relatively easy for an application to be tuned to trade off between access time for the database and data storage space requirements.

In general, lowering threshold levels will cause more data to be stored in the database, raising storage requirements but decreasing access time. In a complementary manner, raising threshold levels will tend to increase access times because a larger number of data calculations will be made at runtime. However, in return less storage is required for the database.

By providing adjustable threshold levels, the performance of any given database can be easily optimized to suit any desired application. Adjustment of threshold levels will require that new determinations be made as to which intersections store precalculated data, but no major restructuring or recompilation is needed.

In addition to the above trade off, storing less data by raising threshold levels will cause updates to execute faster. This results from the decreased number of calculations to be made at update time.

While the invention has been particularly shown and described with reference to a preferred embodiment, it will be understood by those skilled in the art that various changes in form and detail may be made therein without departing from the spirit and scope of the invention.

What is claimed is:

1. In a multidimensional database in which data is provided in hierarchical levels, a method comprising the steps of:

setting a threshold value for a selected level;

for each member of the selected level that has more descendants than the level threshold value, aggregating a data measure for all descendants of the member, and storing the aggregated value with the member.

2. The method of claim 1, wherein for members of the selected level having less descendants than the threshold value, not aggregating or storing the data measure with the member.

3. The method of claim 1, wherein more than one level is assigned a threshold.

4. The method of claim 3, wherein at least two distinct levels have thresholds set at different values.

5. The method of claim 1, wherein the step of aggregating the data measure comprises the step of precalculating the data measure for all descendants of the member, and the storing step comprises storing the precalculated data measure with the member.

6. The method of claim 5, wherein the precalculating step comprises summing the data measure for all descendants of the member.

7. The method of claim 1, wherein the step of aggregating the data measure comprises summing the data measure for all descendants of the member.

8. The method of claim 1 further comprising the step of, for each member of the database:

defining a count for that member to be 1 if the member has no children;

defining a count for that member to be equal to the sum of counts for all children of the member; and resetting the count for a member to 1 if its count exceeds the threshold, and contemporaneously aggregating the data measure for all descendants of the member.

9. A database system, comprising:

a multidimensional database having a plurality of database intersections, the intersections having data organized as hierarchical levels having members;

for each member, a count value indicating a number of descendant members required to compute the member, a flag indicating whether the member is stored or not stored, and a value indicating a child level of the member to be accessed;

for each level, a threshold value; and a procedure for, when count values for a member's children sum to a value greater than the threshold value for the member, storing a precalculated aggregated data measure for the descendants of the member into the member.

10. The system of claim 9, wherein each level has a threshold value that is independent of the threshold values for the remaining levels.

11. Software for aggregating multidimensional data provided in hierarchical levels, the software embodied in a computer-readable medium and, when executed, operable to:

receive a threshold value for a selected level;

for each member of the selected level that has more descendants than the level threshold value, aggregating a data measure for all descendants of the member, and storing the aggregated value with the member.

12. The software of claim 11, operable to not aggregate or store the data measure with the member for members of the selected level having less descendants than the threshold value.

13. The software of claim 11, wherein a threshold value is received for more than one level.

14. The software of claim 13, wherein at least two distinct levels have thresholds set at different values.

15. The software of claim 11, wherein:

aggregating the data measure comprises precalculating the data measure for all descendants of the member; and storing the aggregated value comprises storing the precalculated data measure with the member.

16. The software of claim 15, wherein precalculating comprises summing the data measure for all descendants of the member.

17. The software of claim 11, wherein aggregating the data measure comprises summing the data measure for all descendants of the member.

18. The software of claim 11 further operable to, for each member of the database:

define a count for that member to be 1 if the member has no children;

define a count for that member to be equal to the sum of counts for all children of the member; and reset the count for a member to 1 if its count exceeds the threshold, and contemporaneously aggregating the data measure for all descendants of the member.

* * * * *